May 15, 1951        T. J. SMULSKI        2,552,822
WINDSHIELD WIPER
Filed Jan. 5, 1946        3 Sheets-Sheet 1
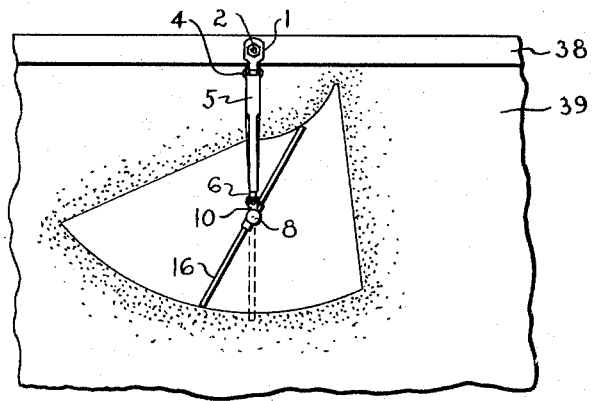
Fig.-1
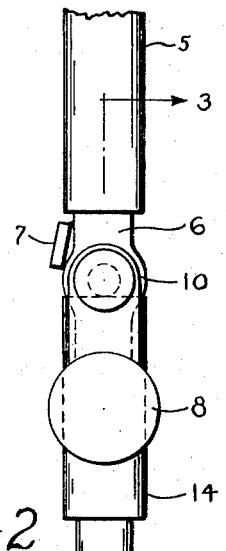
Fig.-2
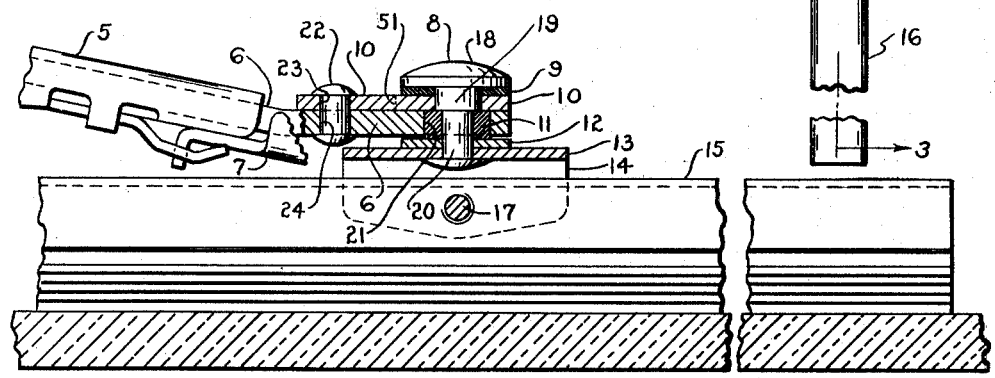
Fig.-3
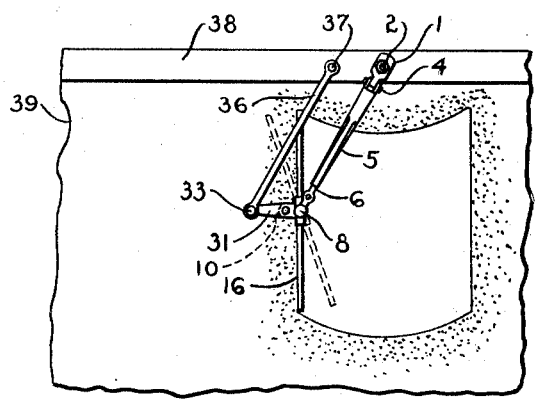
Fig.-5
Fig.-4
INVENTOR
THEODORE J. SMULSKI
BY
Charles S. Penfold
ATTORNEY May 15, 1951 T. J. SMULSKI 2,552,822
WINDSHIELD WIPER
Filed Jan. 5, 1946 3 Sheets-Sheet 2
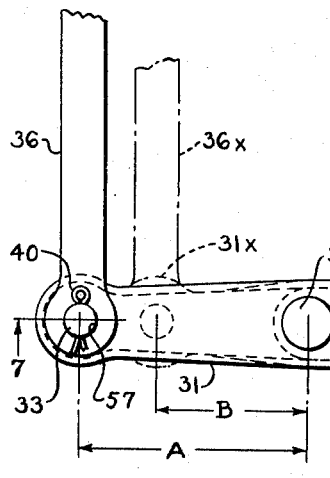
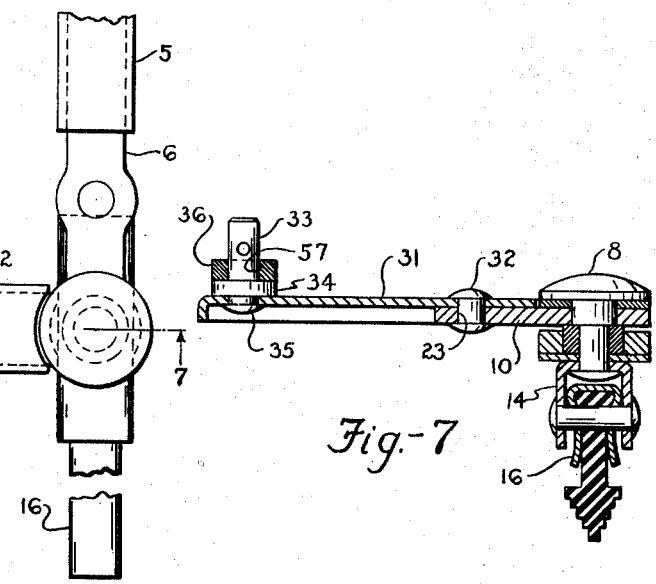
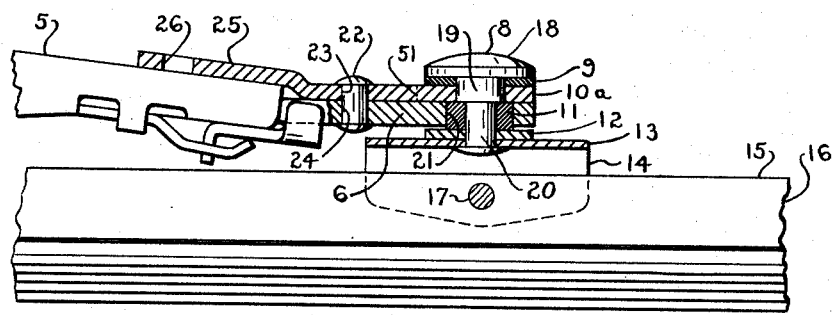
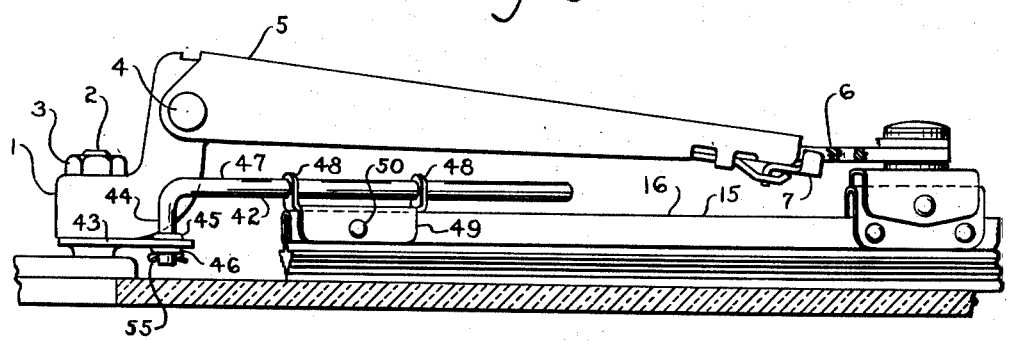
INVENTOR
THEODORE J. SMULSKI
BY
Charles S. Penfold
ATTORNEY May 15, 1951     T. J. SMULSKI     2,552,822
WINDSHIELD WIPER Filed Jan. 5, 1946     3 Sheets-Sheet 3

INVENTOR
THEODORE J. SMULSKI
BY
Charles S. Penfield
ATTORNEY

Patented May 15, 1951

2,552,822

UNITED STATES PATENT OFFICE 2,552,822

WINDSHIELD WIPER

Theodore J. Smulski, Gary, Ind., assignor to Productive Inventions, Inc., a corporation of Indiana Application January 5, 1946, Serial No. 639,383

8 Claims. (Cl. 15—250)

This invention relates to mechanism alternatively usable for connecting the arm and blade members of windshield wipers to one another in such manner that the blade may be secured in different positions of angular adjustment relative to the arm, or in such manner that a freely pivoting connection of the arm and blade may be provided in conjunction with means for controlling relative angular oscillation of the blade and arm about a fore and aft axis.

The primary object of the present invention is to provide a simple and practical construction for effecting standardization of parts of wiper arms, to adapt them for various standard uses of the kind indicated above.

In some instances it is desirable that the wiper blade extend at a fixed angle to the wiper arm. In different installations the desired angle varies. An advantageous construction which admits of adjustment of the blade relative to the arm to any angle desired, and which provides for the retention of the blade in any angular position in which it may be set, is that disclosed in U. S. Patent No. 2,290,140, granted to John W. Anderson on July 14, 1942.

According to another well known practice, it is advantageous to mount the blade upon the wiper arm with complete freedom for rotative movement relative to the wiper arm, and to control the angular disposition of the wiper blade through a parallel link arrangement which causes the wiper blade to maintain an unchanging attitude as it travels from side to side across the windshield.

In accordance with still another standard practice, the wiper blade is mounted on the wiper arm with complete freedom for angular movement relative to the wiper arm about a fore and aft axis, but oscillatory movement of the blade relative to the arm about such axis is produced as an incident of the operation of the arm through suitable movement modifying mechanism.

It is a salient feature of the present invention that a standardized wiper arm construction is provided which is adapted for use in any one of the modes of operation outlined above, together with simple and inexpensive adapter means.

Other objects and advantages will hereinafter appear.

In the drawing forming part of this specification

Figure 1 is a fragmentary view in front elevation of a windshield wiper, the latter of which incorporates features of the invention;

Figure 2 is an enlarged, fragmentary view in front elevation, broken away intermediate its ends for compactness of illustration, showing particularly the means for connecting the wiper blade and arm members to one another in positively fixed relation;

Figure 3 is a fragmentary view in side elevation, partly broken away, and broken away intermediate its ends for compactness of illustration, showing the parts disclosed in Figure 1 on a larger scale than Figure 1, the portion shown in section being viewed in the plane of the line 3—3 of Figure 2, looking in the direction of the arrows;

Figure 4 is a fragmentary view similar to Figure 3 but showing a modification of the structure illustrated in Figure 3;

Figure 5 is a view similar to Figure 1 but illustrating a parallel motion control linkage for the wiper blade;

Figure 6 is a fragmentary view in front elevation, broken away intermediate its ends for compactness of illustration, showing on a larger scale and in greater detail a portion of the structure illustrated in Figure 5;

Figure 7 is a sectional view taken upon the line 7—7 of Figure 6 looking in the direction of the arrows;

Figure 8 is a view generally similar to Figure 3, showing the form in which the wiper arm employed in Figure 7 is commonly to be shipped;

Figure 9 is a view in side elevation, partly broken away, illustrating a wiper arm together with movement modifying means, the arrangement being such that the wiper blade may be pivoted freely on the wiper arm subject to the limitation and control imposed by the movement modifying means;

Figure 10:
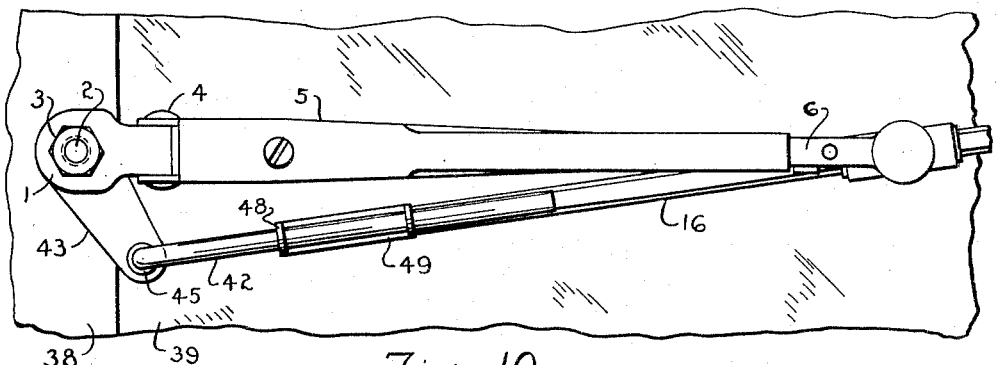
Figure 10 is a fragmentary view in front elevation of the structure illustrated in Figure 9.

As has been indicated, the purpose of the present invention is to secure standardization of wiper arm parts, whether the wiper arm is to be used in a system requiring the wiper blade to be held in different positions of angular adjustment relative to the wiper arm, or whether it is to be used in a system requiring free pivoting of the wiper blade relative to the wiper arm, so that the motion of the wiper blade can be controlled by parallel motion linkage or other suitable movement modifying means. The present invention centers around this feature of adaptability, and the construction of parts of the wiper arm not connected with this feature may be usual or conventional, or of any suitable design, since they do not enter into the invention otherwise than as a part of the necessary environment thereof.

As illustrated herein, the wiper arm per se comprises, as best illustrated in Figure 9, an inner rigid section 1 which is adapted to be secured in any suitable manner upon a windshield wiper shaft 2, as by means of a nut 3 threaded onto the forward end of the shaft 2. The wiper arm section 1 carries a cross pin or rivet 4 upon which a second channeled wiper arm section 5 is pivotally supported, this second wiper arm section being biased toward the windshield, in accordance with well-known practice, by spring means (not shown). A third wiper arm section 6 is telescopically received in the channeled wiper arm section 5, being clamped in a selected position of lengthwise adjustment by a semaphore lever 7, as disclosed and claimed in my Patent No. 2,350,134 which issued May 30, 1944 for Extensible Wiper Arm.

So far as the illustrative disclosure of the present application is concerned, this much of the wiper arm may be the same in all of the forms illustrated, although as has been indicated, there is nothing critically connected with the present invention about any of the details of construction of this much of the wiper arm.

Referring now to Figures 1 to 3, inclusive, a wiper arm adapted for standardized use is illustrated in the form in which it is manufactured and shipped to the user. This arm comprises a rivet 8 which passes successively through a friction washer 9, a link 10, a combined spacing collar and bearing bushing 11, a friction washer 12, and the forward body portion 13 of a U-shaped blade clip 14. The blade clip 14 is secured to the rigid frame 15 of a wiper blade 16 by means of a rivet 17 which is passed through the side walls of the clip 14 and through the blade frame 15. As shown in Figure 3, the blade is free to pivot on the rivet 17, so that the pressure of the blade against the windshield may be automatically equalized throughout the length of the blade.

The rivet 8 comprises a large head 18 and a shank portion 19, the latter being about equal in length to the combined thicknesses of the washer 9 and the link 10. The rivet further includes a reduced shank portion 20 which passes through the bushing 11, the washer 12, and the body portion 13 of the clip 14, being equal in length to the combined thicknesses of these parts. The rear end of the rivet 8 is upset so that the rivet holds the washer 9, the link 10, the bushing 11, and the washer 12 firmly pressed together. The spacing collar 11 fits in an opening 21 in the outer end of wiper arm section 6, and is somewhat thicker than the thickness of the wiper arm section 6. The purpose of providing this difference in thickness will be made clear presently in connection with the description of some of the other figures.

The link 10 extends inward along the wiper arm section 6 in engagement with the latter, and is affixed to it by a rivet 22 which passes through openings 23 and 24 formed respectively in the link 10 and in the wiper arm section 6. Thus, the link 10 and the wiper arm section 6 are positively secured in immovable relation to one another.

With the parts assembled and organized as illustrated in Figures 1 to 3, and as hereinabove described in connection with said figures, the wiper blade is adapted to be adjusted relative to the wiper arm about the axis of rivet 8 and held frictionally in adjusted position by coaction of the friction washer 9 with the link 10. Since the link 10 is not capable of any movement whatever with respect to the wiper arm section 6, the frictional securement of the blade in adjusted angular relation to the link 10 serves also to fix the wiper blade in adjusted angular relation to the wiper arm section 6.

The construction described is a suitable standard form in which a windshield wiper embodying the present invention is manufactured and shipped. As thus manufactured and shipped the wiper is not limited to use in the exact form in which it is illustrated in Figures 1 to 3.

The wiper of Figures 1 to 3, including all of the parts heretofore described, is adapted for use in a mechanism like that illustrated in Figures 5, 6 and 7. Corresponding reference characters are accordingly applied in Figures 5 to 7 to parts which are duplicates of those shown and described in and in connection with Figures 1 to 3.

In the construction illustrated in Figures 5, 6 and 7, the wiper blade 16 is controlled to maintain a fixed attitude as it is swept back and forth by the oscillatory wiper arm, this mode of operation being brought about through a parallel link arrangement. For this purpose it is necessary that the wiper blade 16 be capable of free pivotal movement relative to the wiper arm.

In the construction illustrated in Figures 5, 6 and 7, the rivet 22, which is desirably formed of malleable iron or other soft metal, is cut away and withdrawn from the holes 23 and 24 in the link 10 and the wiper arm section 6. The link 10 is thus rendered free to turn relative to the wiper arm section 6, and the rivet 8, together with the blade clip 14 which were held against pivotal movement before only because the link 10 was held against pivotal movement by the rivet 22, are rendered free to turn with the link 10.

The friction washer 12 restrains the clip 14 and the rivet 8 against rotation relative to the bushing member 11, and the friction washer 9 restrains the rivet 8 against rotation relative to the link 10, but since the bushing 11 is rotatably mounted in wiper arm section 6, the link 10, the rivet 8, the washers 9 and 12, the clip 14 and the bushing 11 are free to turn in unison relative to the wiper arm section 6. It is for the purpose of assuring this freedom that the bushing 11 is made thicker than the wiper arm section 6, so that there will be no frictional pressure exerted against the front and rear faces of the wiper arm section 6.

A link extension arm 31 is fixedly secured to the link 10 by means of a rivet 32 which is passed through an opening in the extension arm 31 and through the opening 23 in the link 10, and upset to clamp these parts firmly together. The extension arm 31 is a sheet metal channelled member the side walls of which embrace and fit the sides of link 10 and positively preclude pivoting of the extension arm relative to the link 10.

The extension arm 31 includes at the outer end thereof a pivot pin 33. This pin includes a spacing collar 34 which engages the front face of the extension arm 31 and a rear end portion 35 which is passed through an opening in the outer end of the extension arm 31 and upset.

A link 36 is pivotally connected at 37 to the frame 38 of windshield 39 at a definite distance from the axis of wiper actuating shaft 2. The link 36 is formed with an opening 57 in its outer end for receiving and substantially fitting the pivot pin 33. The link 36 may be retained in place on the pivot pin 33 by means of a cotter pin 40.

The distance from 37 to the axis of shaft 2 is the same as the distance from the axis of rivet 8 to the axis of pivot pin 33, the extension member 31 being so chosen as to secure this relationship. The distance from the axis of pivot 37 to the axis of pivot pin 33 is equal to the distance from the axis of shaft 2 to the axis of rivet 8.

With the arrangement described, a parallel motion is provided, the combined link 10—31 being maintained always in parallelism to a line joining the axis of shaft 2 with the axis of pivot 37. Since the combined link 10—31 is fixed angularly with respect to the wiper blade, the attitude of the wiper blade is maintained the same at all times.

It is also to be noted that with the arrangement illustrated in Fig. 5 the wiper blade may still be adjusted angularly relative to the link 10, and that it will be frictionally retained in any angular relation to the link 10 to which it may be adjusted.

In Fig. 6 an extension member 31 is shown in full lines and a shorter extension member 31x is shown in broken lines. The purpose is to show how an effective length of link may be provided corresponding with the distance between the axis of shaft 2 and the point 37 for securing a parallel motion linkage. The position of arm 36 corresponding to the use of extension member 31x is indicated in dot and dash lines at 36x in Fig. 6.

While these links have been described solely from the viewpoint of securing a parallel motion linkage, it will be appreciated that desirable modifications of movement of the wiper blade relative to the wiper arm may be had by making the composite link 10—31 of a different length from the distance between the axis of shaft 2 and the point 37.

In Fig. 4 a construction is illustrated which is a modification of that shown in Figs. 1 to 3. The parts are all identical with the parts shown in Figs. 1 to 3 with the single exception that a case hardened self-tapping screw 41 is substituted for the rivet 22. This screw is of a familiar type manufactured and sold by the Parker Kalon Corporation which is adapted to cut its own thread through the openings 23 and 24 of the link 10 and the arm section 6 and to establish a vibration proof connection between these members. Although the screw constitutes a very secure and dependable anchoring device for joining the members 6 and 10 to one another, it can be backed out of the openings 23 and 24 by a workman to free the link 10 for rotation relative to the arm section 6 when an organization like that of Figs. 5 to 7, inclusive, is desired.

The structure illustrated in Fig. 8 is desirably the same in all respects as the structure illustrated in Figs. 1 to 3 with the exception that a link 10a is substituted for the link 10, which is longer than the link 10 of Figs. 1 to 3. The link 10a includes an offset end portion 25 which is adapted to bear against the forward face of the wiper arm section 5 when the parts are secured in the relative positions illustrated in Fig. 8. The offset portion 25 is formed with an opening 26.

As shown in Fig. 8 the wiper arm is adapted to operate in exactly the way described with reference to Figs. 1 to 3.

When it is desired to use the structure of Fig. 8 in connection with a parallel motion linkage, however, the rivet 22 is cut away and removed from the openings 23 and 24 to free the link 10a, the wiper blade 16, and the parts connecting them to one another, for rotative movement relative to the arm section 6. The link 10a then takes the place of the composite link 10—31 of Figs. 5 to 7.

In this instance, however, the link 10a is pivotally connected to the parallel motion link 36 by means of a separate headed pivot pin 52. The shank of pin 52 is passed upward through the opening 57 of link 36 and through the opening 58 of link 10a. A washer 53 is impaled upon the shank of pin 52 to engage the upper face of link 10a, and the parts are held in assembled relation by a pin 54 which is passed through the upper end of pin 52. The length of link 10a may be chosen in accordance with the known requirements of the installation to which the wiper is to be applied. The wiper arm, itself, may be adjusted in length to correspond to the effective length of link 36.

Either the structure of Figs. 1 to 3, Fig. 4, or Fig. 8 may be employed in connection with movement modifying mechanism of the kind illustrated in Figs. 9 and 10.

In this kind of construction the wiper blade 16 is caused to oscillate relative to the wiper arm during operation so that a free swiveling of the wiper blade relative to the wiper arm is desired.

A guide rod 42 is pivotally mounted on a stationary arm 43. The guide rod 42 includes a forwardly extending portion 44 which includes a bearing collar 45 for engaging the arm 43, and the rod is held to the plate by means of a washer 46 and a cotter pin 55, the latter being passed through the rear end of the portion 44 of rod 42. The rod 42 also includes an outwardly extending portion 47 which extends slidingly through ears 48 formed on a guide clip 49, the clip, in turn, being affixed to the inner end of the wiper blade frame 15 by a rivet 50.

For an installation involving this type of movement modifying mechanism a free swiveling of the wiper blade 16 relative to the wiper arm is desired. Accordingly, the rivet 22 is cut off and driven out of the openings 23 and 24, and the link 10 of Figs. 1 to 3 or 10a of Fig. 8 is then cut off along the dotted line designated 51.

Figures 11, 13:
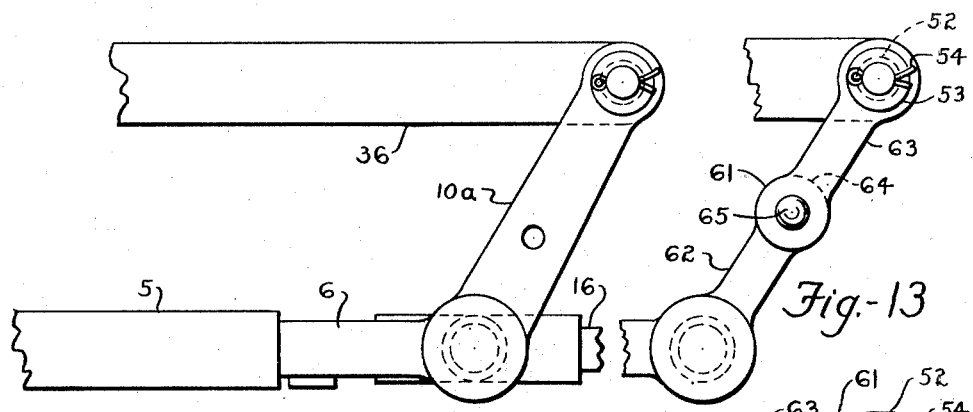
Figure 11 illustrates an arrangement as an alternative to that of Figures 5 to 7 in which the standard link which forms part of the standard arm as disclosed in Figure 8, is employed for its full length as one of the elements of a parallel motion linkage.
Figure 13 is a view generally similar to Figure 11 disclosing a structure employing a link which is adjustable as to effective length.
Figure 14:
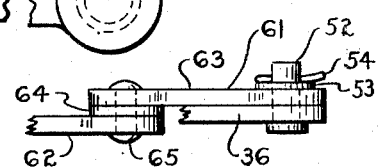
Figure 14 is an edge view of an adjustable link which may be advantageously employed in structures involving parallel motion linkage.
Figure 12:
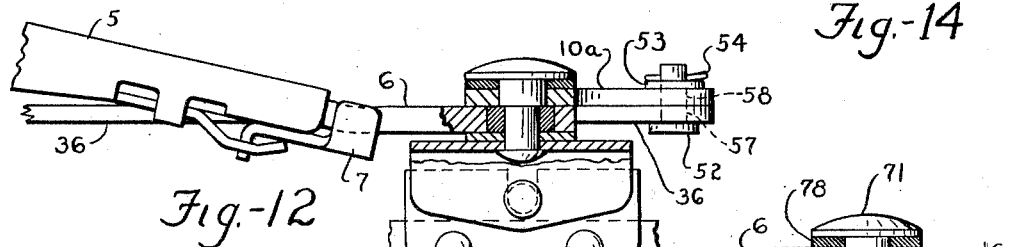
Figure 12 is a view generally similar to Figure 3, showing the structure of Figure 11 in side elevation.

As an alternative to the employment of the straight link 10a in the combination of Figs. 8, 11 and 12 or the composite link 10—31 in the combination of Figs. 5 to 7, a link 61 may be employed having capacity for adjustment as to its effective length. This link comprises two sections, 62 and 63, which are connected respectively to the wiper arm section 6 and to the link 36 in the manner illustrated in Figs. 8, 11 and 12. The free ends of the link sections 62 and 63 are overlapped, and a friction washer 64 is interposed between them. A rivet 65 passed through the link sections 62 and 63 and through the washer 64 clamps the overlapped ends of the link sections in firm frictional engagement with the opposite faces of the washer 64.

The sections 62 and 63 are normally maintained by friction in fixed angular relation to one another, but they may be adjusted angularly and held frictionally in the new adjusted relationship to establish any desired effective length of the link within the capacity of the structure. With this arrangement a considerable variety of installations can be accommodated without the necessity for providing alternative forms of links or link elements.

The composite link 62—63 may be utilized in place of the link 10 of Figs. 1 to 3, by folding the composite link at the joint and securing its free end to the wiper section 6 by means of a rivet 22.

Figures 15, 16:
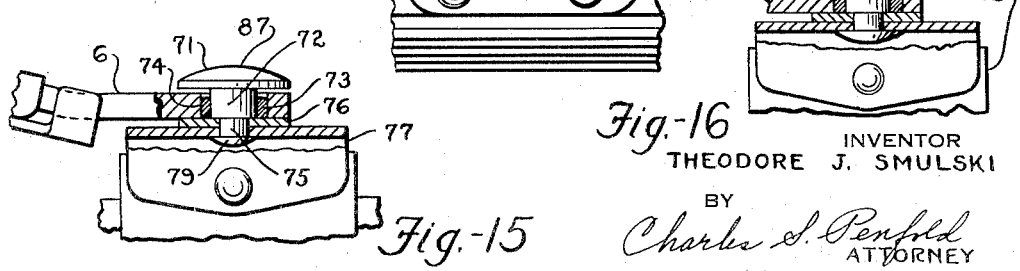
Figure 15 is a fragmentary view, partly broken away, showing a free pivotal connection between the wiper arm and blade clip.
Figure 16 is a view similar to Fig. 15 and showing the identical structure of Figure 15, but with a friction washer added so that the wiper blade may be retained frictionally in various adjusted angular relations to the arm.

The structure illustrated in Fig. 15 corresponds generally to that shown in Fig. 3 save that the friction washer 9, the link 10, and the rivet 22, of Figure 3 are omitted.

A rivet 71 has a shank portion 72 which is passed through a bearing bushing 73, the bearing bushing being rotatably received in an opening 74 formed in the wiper arm 6. A reduced shank portion 75 of the rivet 71 is passed through a friction washer 76 and the blade clip 77. The rear end of the rivet 71 is upset to form a head 87. The friction washer 76 is clamped between a wall of the blade clip 77 and a shoulder which is formed at the rear end of shank portion 72 of the rivet 71. The shank portion 72 of the rivet is of greater length than the thickness of the arm section 6, while the bearing bushing 73 is of less thickness than the arm section 6, so that the rivet together with the blade clip 77 can turn freely with relation to the arm section 6. This construction is adapted for use in connection with a movement modifying mechanism of the kind illustrated in Figure 9.

Figure 16 shows the identical construction of Figure 15 with the exception that a friction washer 78 is interposed between the head of the rivet 71 and wiper arm section 6. The thickness of the friction washer 78 is such that the washer is caused to bear in firm frictional engagement with the head of the rivet and with the arm section 6. It will be seen that the free pivoting connection of Figure 15 and the frictional adjusting connection of Figure 16 employ identical parts, save that the washer 78 is present in Figure 16, but absent in Figure 15.

I have described what I believe to be the best embodiments of my invention. I do not wish, however, to be confined to the embodiments shown, but what I desire to cover by Letters Patent is set forth in the appended claims.

I claim:

1. In a windshield wiper, the combination with a wiper blade and a wiper arm of a link connected at one end to the arm and to the blade with capacity for movement relative to the arm about a fore and aft axis, means about the axis frictionally opposing movement of the blade relative to the link about said axis, and means whereby a portion of the link can be positively secured to the arm to secure the link against movement relative to the arm about said axis.

2. In a windshield wiper, the combination with a wiper arm and a wiper blade, of mechanism for mounting the blade on the arm comprising a member fixedly secured to a portion of the blade and mounted on the arm with capacity for rotative movement relative thereto about a fore and aft axis, an element mounted upon said member, automatic means about the axis for frictionally opposing rotation of said member relative to said element about a fore and aft axis, and fastening means whereby the element can be positively secured to the wiper arm against rotative movement relative thereto.

3. In a windshield wiper, the combination with a wiper arm and a wiper blade, of mechanism mounting the blade on the arm comprising a member fixedly secured to a portion of the blade and mounted on the arm with capacity for rotative movement relative thereto about a fore and aft axis, an element impaled upon said member, and means about the axis for frictionally opposing rotation of said member relative to said element about a fore and aft axis, said wiper arm and element having openings at equal distances from said axis which may be brought into registration for reception of a through fastener by rotation of the element relative to the arm.

4. In a windshield wiper, the combination with a wiper blade and a wiper arm, of an element connected to the arm and to the blade with capacity for movement relative to either about a fore and aft axis, means about the axis for frictionally opposing movement of the blade relative to the element about said axis, and means connected to the element for controlling movement of the element and blade relative to the arm about said axis.

5. In a windshield wiper, the combination with a wiper blade and a wiper arm, of a link connected to the arm and to the blade with capacity for movement relative to either about a fore and aft axis, means about the axis for frictionally opposing movement of the blade relative to the link about said axis, and means connected to the link and combined therewith to form a parallel motion control linkage for the blade, said linkage including an adapter extension for the link.

6. In a windshield wiper, the combination with a wiper blade and a wiper arm, of a link, connected at one end to the arm and blade, with capacity for movement relative to the arm about a fore and aft axis, means about the axis frictionally opposing movement of the blade relative to the link about said axis, and means whereby the opposite end of the link may be positively secured to the arm to secure the link against movement relative to the arm about said axis, said link including a pair of connected sections.

7. In a windshield wiper, the combination with a wiper blade and a wiper arm, of a headed through fastener passed through the arm and a portion of the blade, said fastener having a head, a shank portion of relatively large diameter adjacent the head, and a shank portion of relatively small diameter remote from the head, a bearing sleeve of less height than the first mentioned shank portion surrounding said portion and rotatively mounted in the wiper arm, and means securing the wiper blade in fixed relation to said through fastener.

8. In a windshield wiper, the combination with a wiper blade and a wiper arm, of a headed through fastener passed through the arm and a portion of the blade, said fastener having a head, a shank portion of relatively large diameter adjacent the head, and a shank portion of relatively small diameter remote from the head, a bearing sleeve of less height than the first mentioned shank portion surrounding said portion and rotatively mounted in the wiper arm, and means securing the wiper blade in fixed relation to said through fastener, and a friction washer firmly clamped between the wiper arm and the head of said through fastener for frictionally opposing movement of the wiper blade relative to the arm about the axis of said through fastener.

THEODORE J. SMULSKI.

REFERENCES CITED

The following references are of record in the file of this patent:

UNITED STATES PATENTS

| Number | Name | Date |
|---|---|---|
| 762,889 | Douglas | June 21, 1904 |
| 2,232,757 | Zeder | Feb. 25, 1941 |
| 2,245,244 | Zaiger | June 10, 1941 |
| 2,265,307 | Orshansky | Dec. 9, 1941 |
| 2,295,620 | Zaiger | Sept. 15, 1942 |
| 2,298,197 | Coffey | Oct. 6, 1942 |
| 2,392,670 | Horton | Jan. 8, 1946 |